US012795312B2

(12) United States Patent
Yore et al.

(10) Patent No.: US 12,795,312 B2
(45) Date of Patent: Nov. 10, 2026

(54) TECHNIQUES FOR PROVIDING ACCESSORY ATTACHMENT FEEDBACK

(71) Applicant: Sonos, Inc., Santa Barbara, CA (US)

(72) Inventors: Jason Yore, Santa Barbara, CA (US); James Park, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 278 days.

(21) Appl. No.: 18/621,824

(22) Filed: Mar. 29, 2024

(65) Prior Publication Data

US 2024/0334144 A1 Oct. 3, 2024

Related U.S. Application Data

(60) Provisional application No. 63/493,496, filed on Mar. 31, 2023.

(51) Int. Cl.
*H04R 29/00* (2006.01)
*H04R 3/00* (2006.01)

(52) U.S. Cl.
CPC ............ *H04R 29/002* (2013.01); *H04R 3/00* (2013.01); *H04R 2420/05* (2013.01); *H04R 2420/09* (2013.01)

(58) Field of Classification Search
CPC .... H04R 29/002; H04R 3/00; H04R 2420/05; H04R 2420/09
See application file for complete search history.

(56) References Cited

U.S. PATENT DOCUMENTS 5,440,644 A 8/1995 Farinelli et al.
5,761,320 A 6/1998 Farinelli et al.
5,923,902 A 7/1999 Inagaki
6,032,202 A 2/2000 Lea et al.
6,256,554 B1 7/2001 DiLorenzo
6,404,811 B1 6/2002 Cvetko et al.
6,469,633 B1 10/2002 Wachter
6,522,886 B1 2/2003 Youngs et al.
6,611,537 B1 8/2003 Edens et al.
6,631,410 B1 10/2003 Kowalski et al.
6,757,517 B2 6/2004 Chang
6,778,869 B2 8/2004 Champion (Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.

(Continued)

*Primary Examiner* — Andrew Sniezek
(74) *Attorney, Agent, or Firm* — Secant IP, P.L.L.C.

(57) ABSTRACT

In one example, a playback device includes one or more speakers, one or more amplifiers configured to drive the one or more speakers, a line-in port configured to receive a line-in connector to couple the playback device to an audio source, and at least one visual context indicator configured to display, during an initialization period of the line-in connector following the audio source being coupled to the playback device via the line-in connector and the line-in port, visual feedback indicating connection of the audio source to the playback device.

18 Claims, 14 Drawing Sheets

(56) References Cited

U.S. PATENT DOCUMENTS

| | | | |
|---|---|---|---|
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2010/0054519 A1* | 3/2010 | Mulvey | G06F 1/1632 381/386 |
| 2019/0286593 A1* | 9/2019 | Li | H04R 1/1033 |
| 2021/0067892 A1* | 3/2021 | Lehnert | H04S 7/302 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

TECHNIQUES FOR PROVIDING ACCESSORY ATTACHMENT FEEDBACK

CROSS REFERENCE TO RELATED APPLICATION

This application claims priority under 35 U.S.C. § 119 (e) to co-pending U.S. Provisional Application No. 63/493,496 titled "TECHNIQUES FOR PROVIDING ACCESSORY ATTACHMENT FEEDBACK" and filed on Mar. 31, 2023, which is hereby incorporated herein by reference in its entirety for all purposes.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The SONOS Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
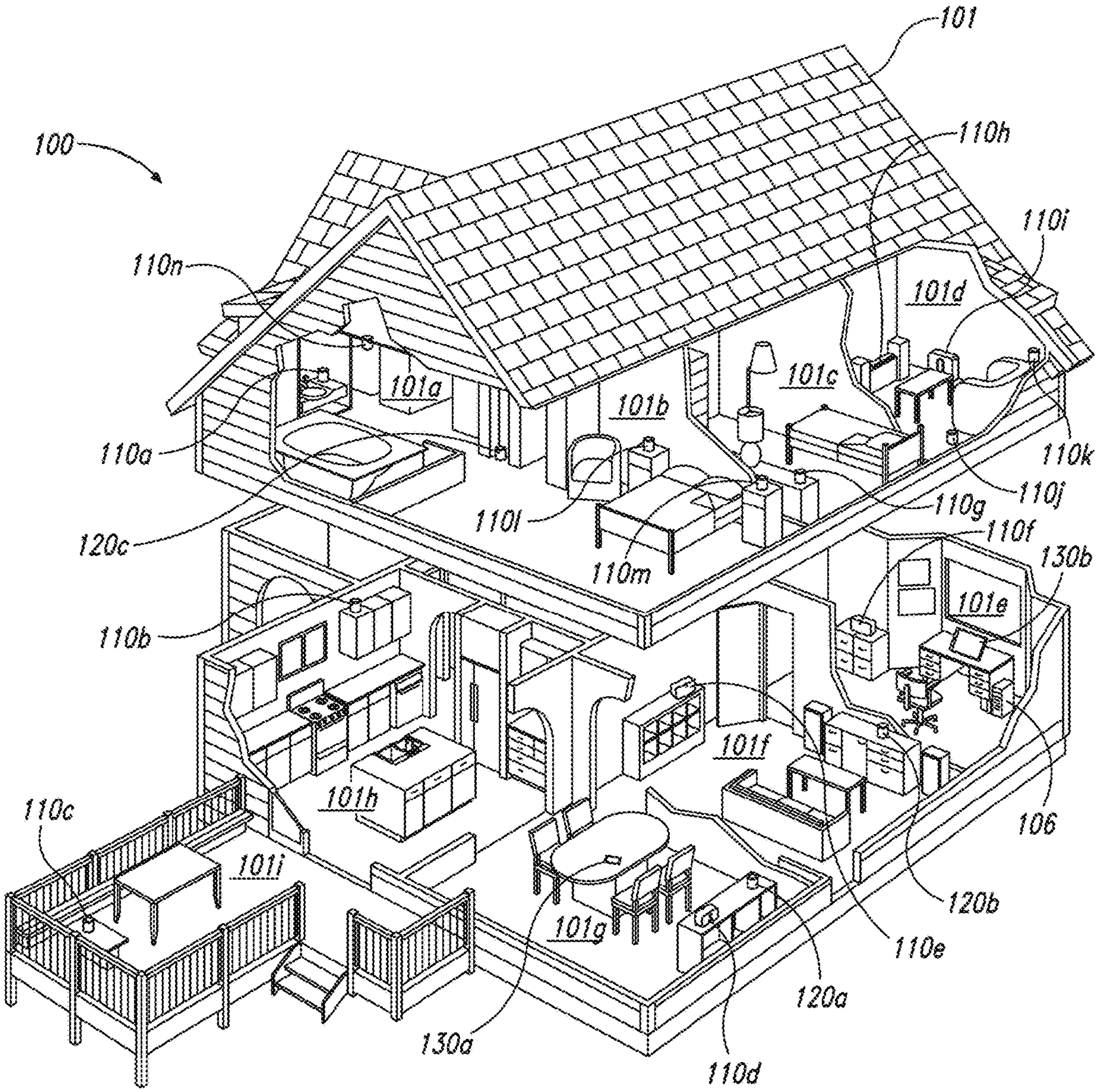
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. OVERVIEW

Embodiments described herein relate to providing a user with feedback, such as one or more visual and/or audio indications, when an accessory or audio source is attached to a playback device.

In some instances in a media playback system, playback devices receive audio content for playback over a wireless link, as described below. However, there are also certain instances in a media playback system where a user may physically connect a so-called "line-in" audio source (such as a turntable, for example) to a playback device, optionally via an accessory that provides compatible connectors for the audio source and the playback device. In some instances, when a line-in device is connected to a playback device, there may be some delay before the playback device begins playback of audio content received via the line-in device. For example, when a line-in audio source is connected to a playback device via a connector accessory (referred to herein as a line-in connector), the playback device and/or the line-in connector may undergo an initialization procedure that enables or "wakes up" the line-in connector and/or establishes any handshakes or other communications protocols needed to allow the playback device to play audio content received via the line-in connector. Thus, there may be a delay between the time when an audio source is connected to the playback device via the line-in connector and when the playback device can begin playing audio content from the audio source. If no feedback is provided to the user during this time, the user may conclude that the line-in connector and/or the playback device are not functioning correctly, or that the line-in connector was not properly attached, for example. This may cause the user to disconnect the audio source or the line-in connector unnecessarily and/or become frustrated with the media playback system because the device(s) do not appear to be functioning as expected. To address this concern and improve the user experience, aspects and embodiments provide techniques by which the playback device can indicate to the user that all components are functioning correctly during the initialization time period. As described in more detail below, feedback can be provided by the playback device in the form of one or more audio and/or visual indicators.

In some embodiments, for example, a playback device comprises one or more speakers, one or more amplifiers configured to drive the one or more speakers, a line-in port configured to receive a line-in connector to couple the playback device to an audio source, and at least one visual context indicator configured to display, during an initialization period of the line-in connector following the audio source being coupled to the playback device via the line-in connector and the line-in port, visual feedback indicating connection of the audio source to the playback device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, clement 110*a* is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. SUITABLE OPERATING ENVIRONMENT

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa). A playback device 110 that includes components and functionality of an NMD 120 may be referred to as being "NMD-equipped."

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices, etc.) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation, etc.). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below with respect to FIGS. 1B-2C, In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane, etc.), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the second bedroom 101*c*, the office 101*e*, the living room 101*f*, the dining room 101*g*, the kitchen 101*h*, and the outdoor patio 101*i* each include one playback device 110, and the master bathroom 101*a,* the master bedroom 101*b* and the den 101*d* include a plurality of playback devices 110. In the master bedroom 101*b,* the playback devices 1101 and 110*m* may be configured, for example, to play back audio content in synchrony as individual ones of playback devices 110, as a bonded playback zone, as a consolidated playback device, and/or any combination thereof. Similarly, in the den 101*d,* the playback devices 110*h-k* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
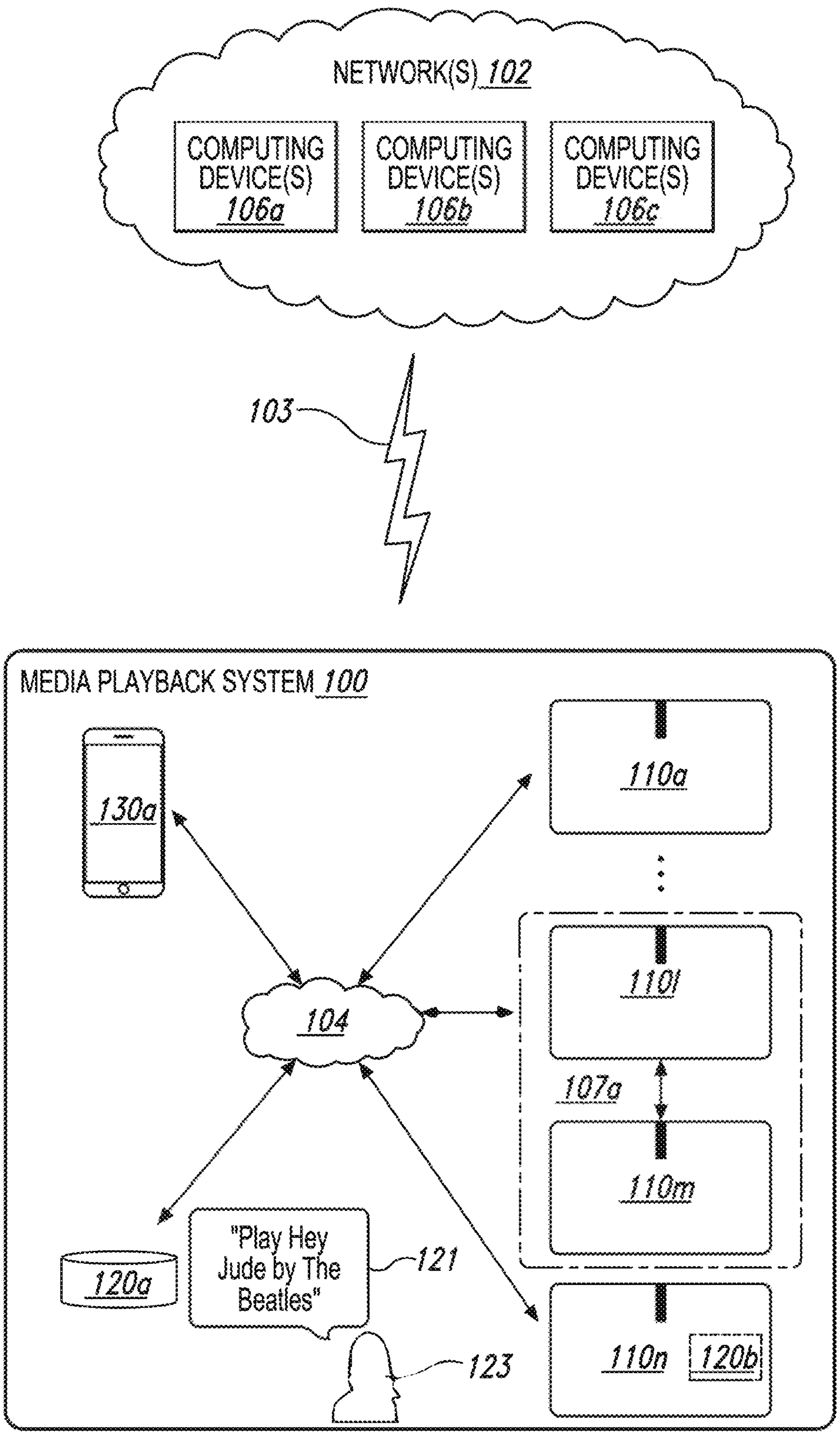
FIG. 1B is a schematic diagram of the media playback system of FIG. 1A and one or more networks.

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content, etc.) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a,* a second computing device 106*b,* and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTH, a Z-WAVE network, a ZIGBEE network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.1lay, 802.15, etc. transmitted at 2.4 Gigahertz (GHz), 5 GHz, 6 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household or commercial facility communication network (e.g., a household or commercial facility WI-FI network). In some embodiments, the links 103 and the network 104 comprise one or more of the same networks. In some aspects, for example, the links 103 and the network 104 comprise a telecommunication network (e.g., an LTE network, a 5G network, etc.). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud servers that host cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length, etc.) and other associated information (e.g., URIs, URLs, etc.) for each identifiable media item found. In some embodiments, for example, the media content database is stored on one or more of the playback devices 110, network microphone devices 120, and/or control devices 130.

In the illustrated embodiment of FIG. 1B, the playback devices 1101 and 110*m* comprise a group 107*a*. The playback devices 1101 and 110*m* can be positioned in different rooms and be grouped together in the group 107*a* on a temporary or permanent basis based on user input received at the control device 130*a* and/or another control device 130 in the media playback system 100. When arranged in the group 107*a,* the playback devices 1101 and 110*m* can be configured to play back the same or similar audio content in synchrony from one or more audio content sources. In certain embodiments, for example, the group 107*a* comprises a bonded zone in which the playback devices 1101 and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*b,* each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a,* for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS, AMAZON, GOOGLE, APPLE, MICROSOFT, etc.). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
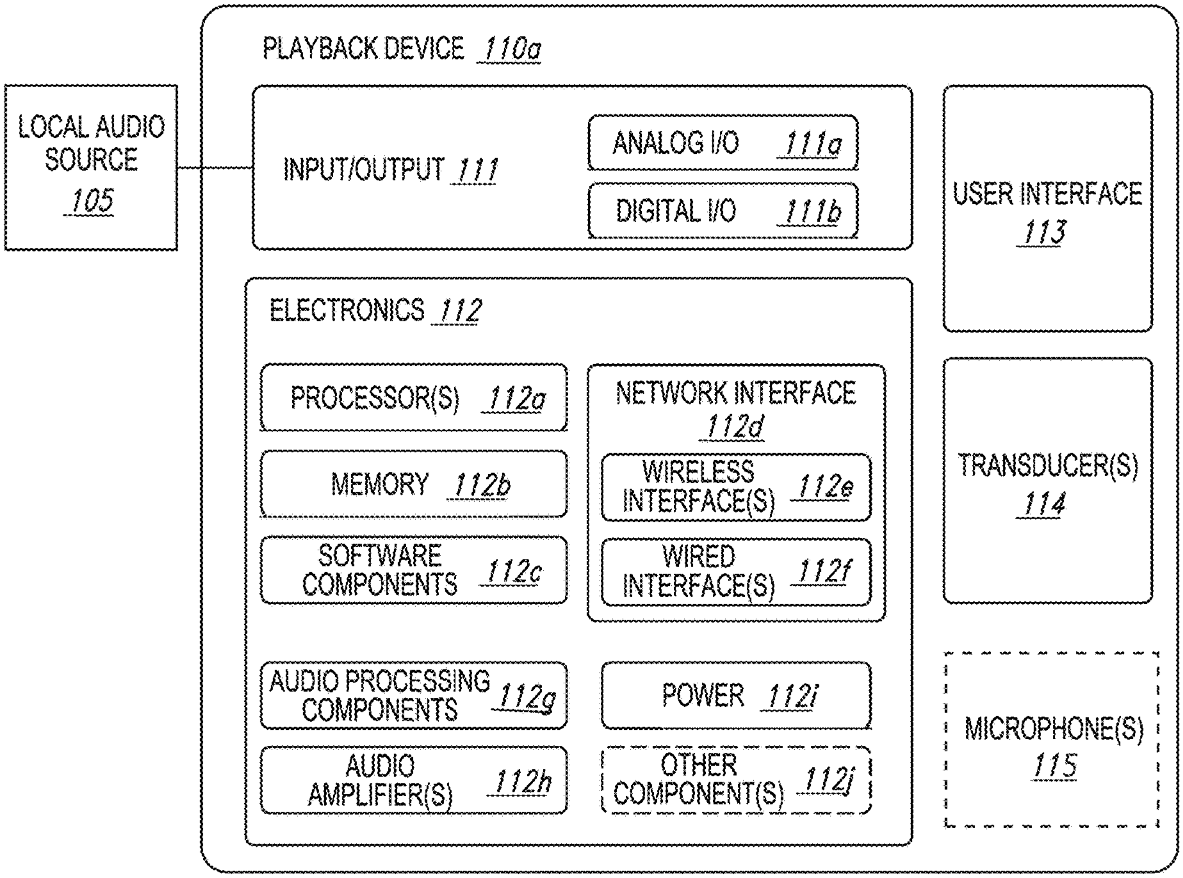
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WI-FI, BLUETOOTH, or another suitable communication link. In certain embodiments, the analog I/O 111*a* and the digital I/O 111*b* comprise interfaces (e.g., ports, plugs, jacks, etc.) configured to receive connectors of cables transmitting analog and digital signals, respectively, without necessarily including cables.

The playback device 110*a,* for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer, etc.) or another suitable audio component (e.g., a television, a desktop computer, an amplifier, a phonograph, such as an LP turntable, a Blu-ray player, a memory storing digital media files, etc.). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens, etc.), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases, etc.).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone, etc.).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds, etc.) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receive and process the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE, etc.). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 exclude the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DACs), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omit the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112_h_ include one or more switching or class-D power amplifiers. In other embodiments, however, the amplifiers 112_h_ include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class H amplifiers, and/or another suitable type of power amplifier). In certain embodiments, the amplifiers 112_h_ comprise a suitable combination of two or more of the foregoing types of power amplifiers. Moreover, in some embodiments, individual ones of the amplifiers 112_h_ correspond to individual ones of the transducers 114. In other embodiments, however, the electronics 112 include a single one of the amplifiers 112_h_ configured to output amplified audio signals to a plurality of the transducers 114. In some other embodiments, the electronics 112 omit the amplifiers 112_h_.

The transducers 114 (e.g., one or more speakers and/or speaker drivers) receive the amplified audio signals from the amplifier 112_h_ and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
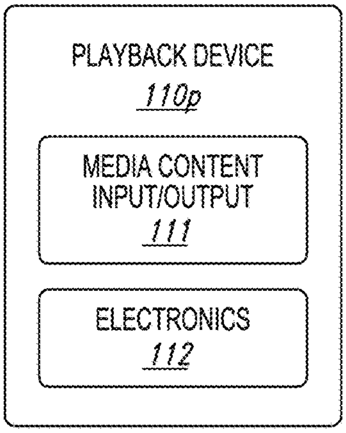
FIG. 1D is a block diagram of a playback device.

By way of illustration, Sonos, Inc. presently offers (or has offered) for sale certain playback devices including, for example, a "SONOS ONE," "PLAY:1," "PLAY:3," "PLAY: 5," "PLAYBAR," "PLAYBASE," "CONNECT: AMP," "CONNECT," "AMP," "PORT," and "SUB." Other suitable playback devices may additionally or alternatively be used to implement the playback devices of example embodiments disclosed herein. Additionally, one of ordinary skill in the art will appreciate that a playback device is not limited to the examples described herein or to Sonos product offerings. In some embodiments, for example, one or more playback devices 110 comprise wired or wireless headphones (e.g., over-the-ear headphones, on-ear headphones, in-car earphones, etc.). In other embodiments, one or more of the playback devices 110 comprise a docking station and/or an interface configured to interact with a docking station for personal mobile media playback devices. In certain embodiments, a playback device may be integral to another device or component such as a television, an LP turntable, a lighting fixture, or some other device for indoor or outdoor use. In some embodiments, a playback device omits a user interface and/or one or more transducers. For example, FIG. 1D is a block diagram of a playback device 110_p_ comprising the input/output 111 and electronics 112 without the user interface 113 or transducers 114.

Figure 1E:
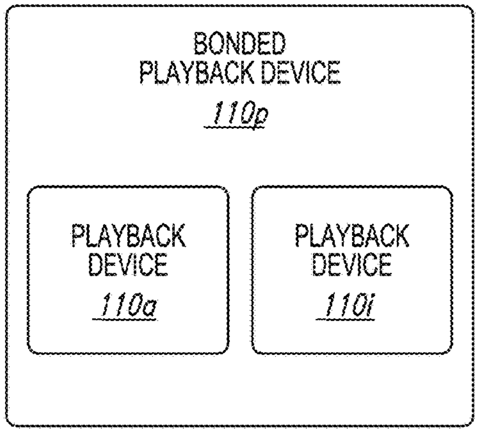
FIG. 1E is a block diagram of a bonded playback device.

FIG. 1E is a block diagram of a bonded playback device 110_q_ comprising the playback device 110_a_ (FIG. 1C) sonically bonded with the playback device 110_i_ (e.g., a subwoofer) (FIG. 1A). In the illustrated embodiment, the playback devices 110_a_ and 110_i_ are separate ones of the playback devices 110 housed in separate enclosures. In some embodiments, however, the bonded playback device 110_q_ comprises a single enclosure housing both the playback devices 110_a_ and 110_i_. The bonded playback device 110_q_ can be configured to process and reproduce sound differently than an unbonded playback device (e.g., the playback device 110_a_ of FIG. 1C) and/or paired or bonded playback devices (e.g., the playback devices 1101 and 110_m_ of FIG. 1B). In some embodiments, for example, the playback device 110_a_ is a full-range playback device configured to render low frequency, mid-range frequency, and high frequency audio content, and the playback device 110_i_ is a subwoofer configured to render low frequency audio content. In some aspects, the playback device 110_a_, when bonded with the first playback device, is configured to render only the mid-range and high frequency components of a particular audio content, while the playback device 110_i_ renders the low frequency component of the particular audio content. In some embodiments, the bonded playback device 110_q_ includes additional playback devices and/or another bonded playback device. Additional playback device embodiments are described in further detail below with respect to FIGS. 2A-D.

c. Suitable Network Microphone Devices (NMDs)

Figure 1F:
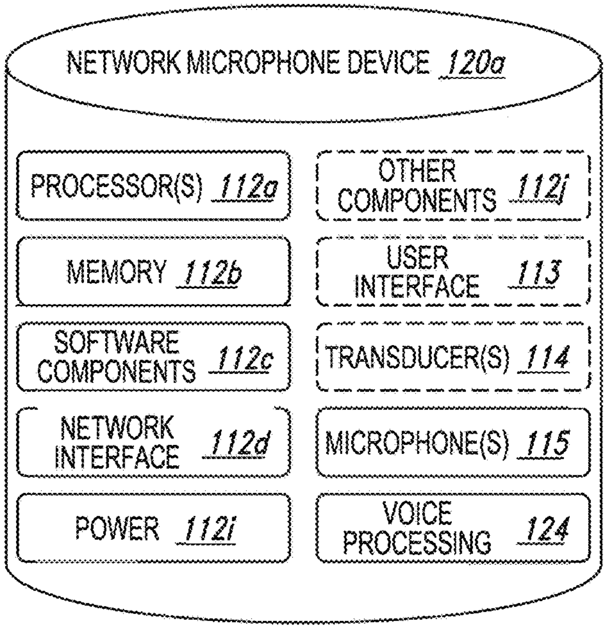
FIG. 1F is a block diagram of a network microphone device.

FIG. 1F is a block diagram of the NMD 120_a_ (FIGS. 1A and 1B). The NMD 120_a_ includes one or more voice processing components 124 (hereinafter "the voice components 124") and several components described with respect to the playback device 110_a_ (FIG. 1C) including the processors 112_a_, the memory 112_b_, and the microphones 115. The NMD 120_a_ optionally comprises other components also included in the playback device 110_a_ (FIG. 1C), such as the user interface 113 and/or the transducers 114. In some embodiments, the NMD 120_a_ is configured as a media playback device (e.g., one or more of the playback devices 110), and further includes, for example, one or more of the audio components 112_g_ (FIG. 1C), the amplifiers 112_h_, and/or other playback device components. In certain embodiments, the NMD 120_a_ comprises an Internet of Things (IoT) device such as, for example, a thermostat, alarm panel, fire and/or smoke detector, etc. In some embodiments, the NMD 120_a_ comprises the microphones 115, the voice processing components 124, and only a portion of the components of the electronics 112 described above with respect to FIG. 1C. In some aspects, for example, the NMD 120_a_ includes the processor 112_a_ and the memory 112_b_ (FIG. 1C), while omitting one or more other components of the electronics 112. In some embodiments, the NMD 120_a_ includes additional components (e.g., one or more sensors, cameras, thermometers, barometers, hygrometers, etc.).

Figure 1G:
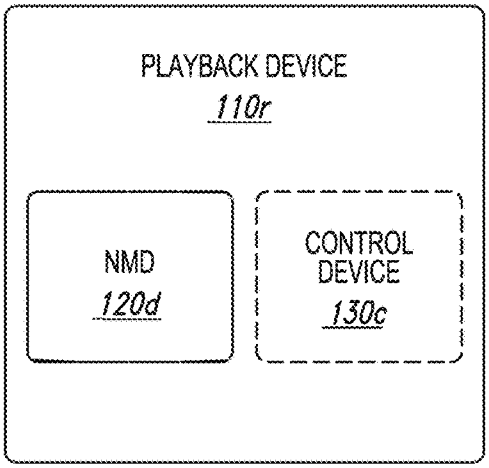
FIG. 1G is a block diagram of a playback device.

In some embodiments, an NMD can be integrated into a playback device. FIG. 1G is a block diagram of a playback device 110_r_ comprising an NMD 120_d_. The playback device 110_r_ can comprise many or all of the components of the playback device 110_a_ and further include the microphones 115 and voice processing components 124 (FIG. 1F). The playback device 110_r_ optionally includes an integrated control device 130_c_. The control device 130_c_ can comprise, for example, a user interface (e.g., the user interface 113 of FIG.

1C) configured to receive user input (e.g., touch input, voice input, etc.) without a separate control device. In other embodiments, however, the playback device 110*r* receives commands from another control device (e.g., the control device 130*a* of FIG. 1B). Additional NMD embodiments are described in further detail below with respect to FIGS. 2A-D.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa." Other examples include "Ok, Google" for invoking the GOOGLE VAS and "Hey, Siri" for invoking the APPLE VAS.

After detecting the activation word, voice processing components 124 monitor the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
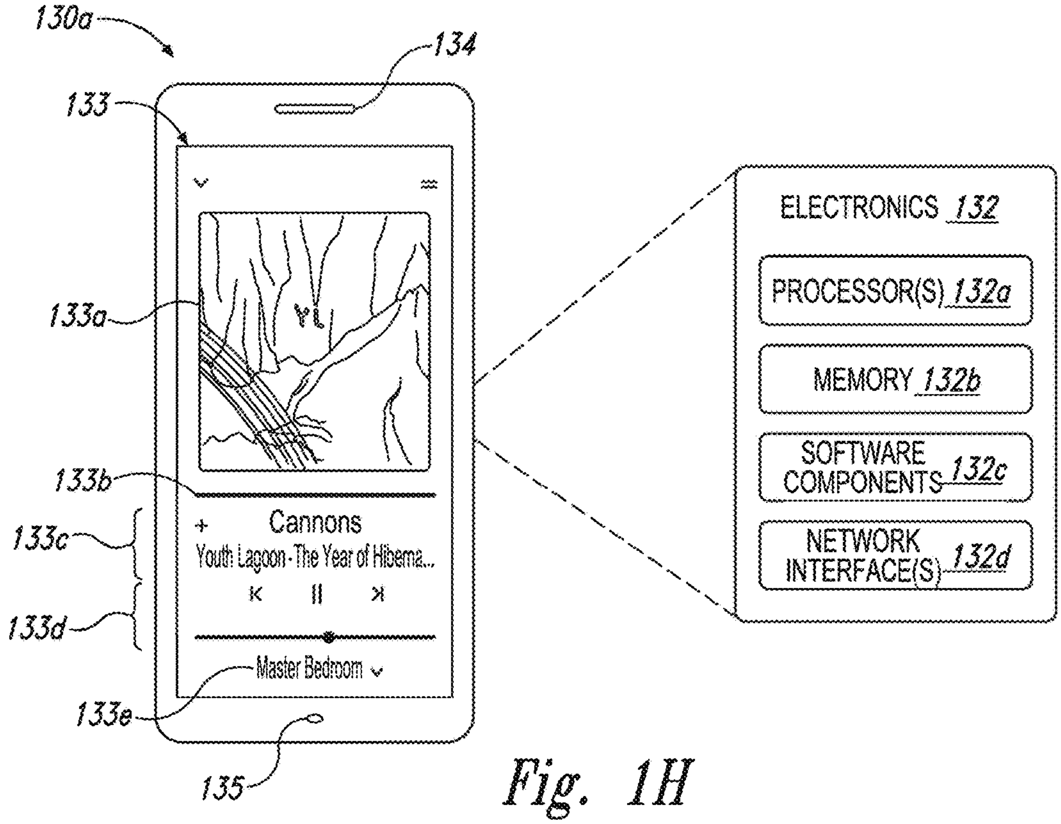
FIG. 1H is a partial schematic diagram of a control device.

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone, etc.) on which media playback system controller application software is installed. In some embodiments, the control device 130*a* comprises, for example, a tablet (e.g., an iPad™), a computer (e.g., a laptop computer, a desktop computer, etc.), and/or another suitable device (e.g., a television, an automobile audio head unit, an IoT device, etc.). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 132*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE, etc.). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection, etc.) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos, etc.), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year, etc.) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region

133*d* may also include selectable icons to modify equalization settings, playback volume, and/or other suitable playback actions. In the illustrated embodiment, the user interface 133 comprises a display presented on a touch screen interface of a smartphone (e.g., an iPhone™ an Android phone, etc.). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound, etc.) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

III. EXAMPLE SYSTEMS AND DEVICES

Figure 2A:
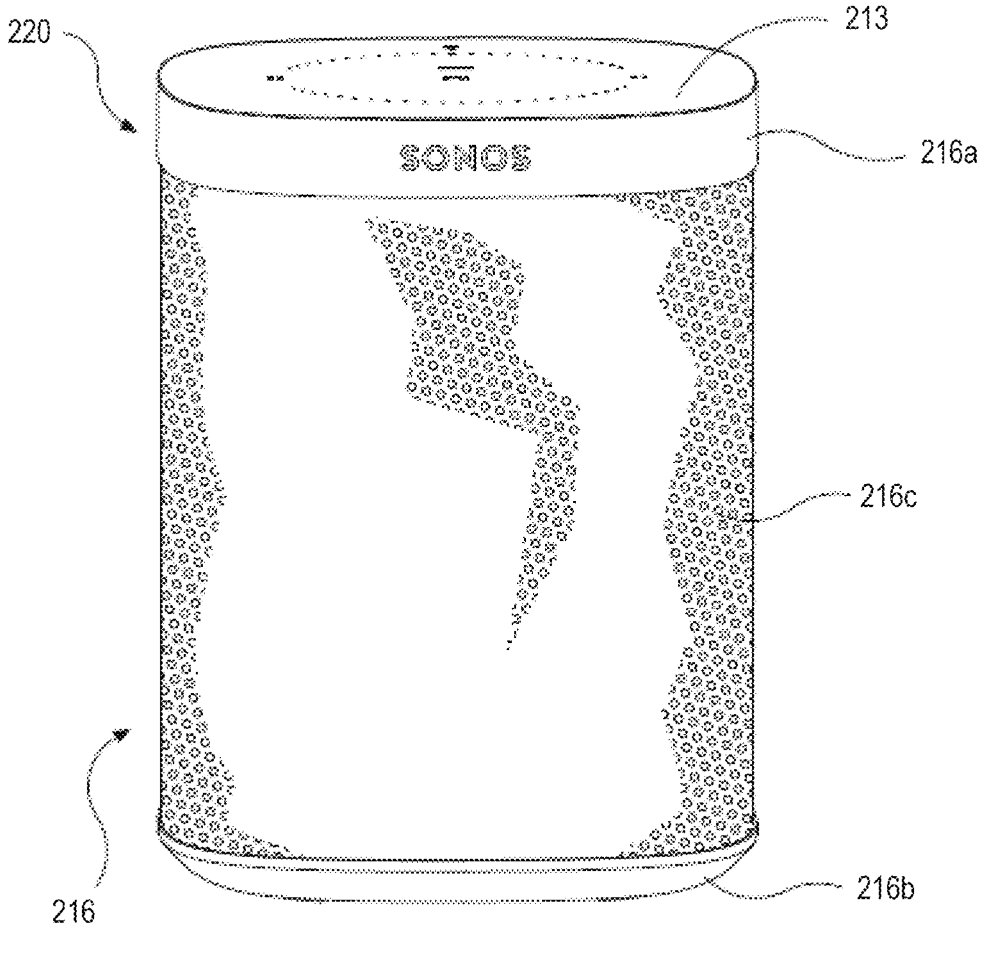
FIG. 2A is a front view of a network microphone device configured in accordance with aspects of the disclosed technology.
Figure 2B:
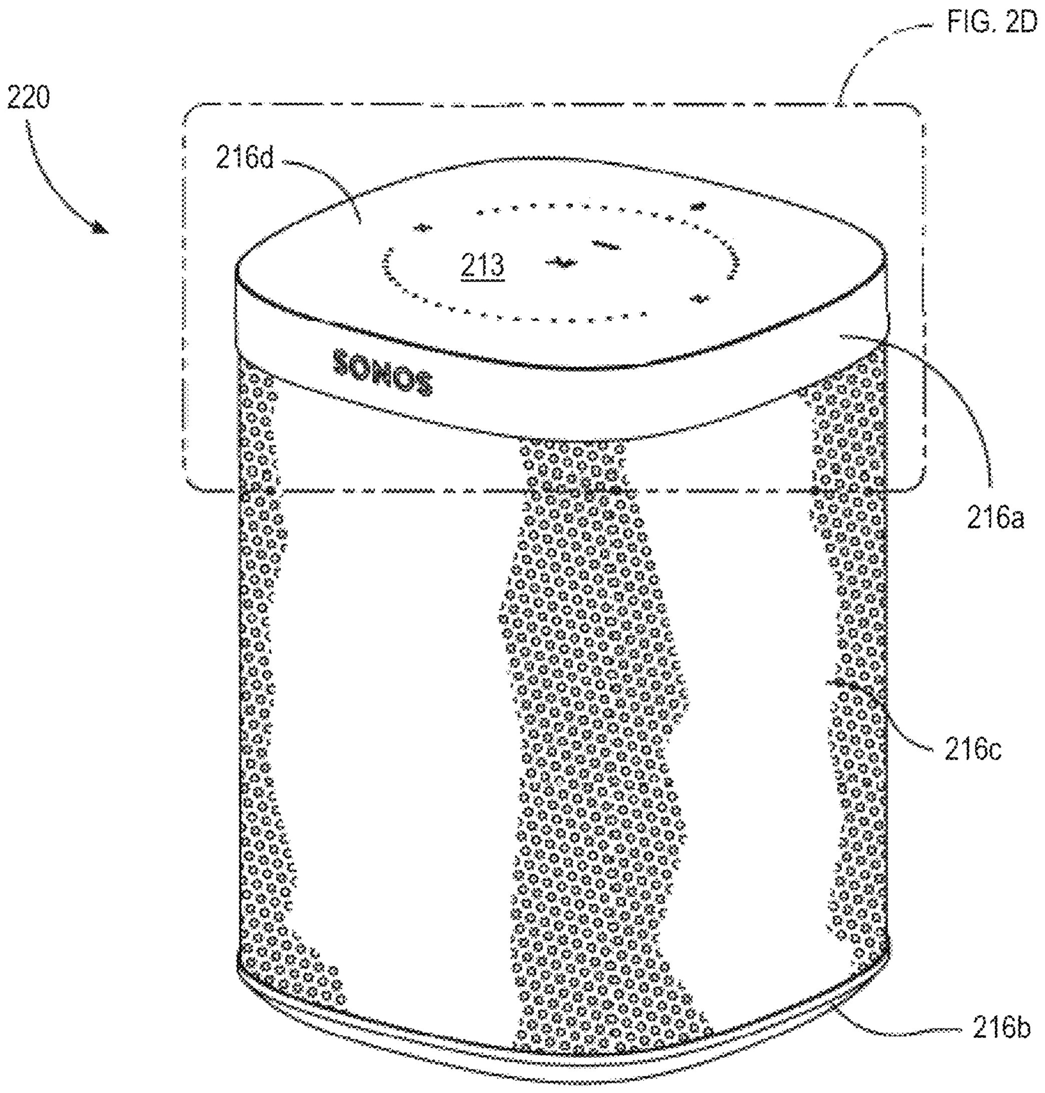
FIG. 2B is a side isometric view of the network microphone device of FIG. 2A.
Figure 2C:
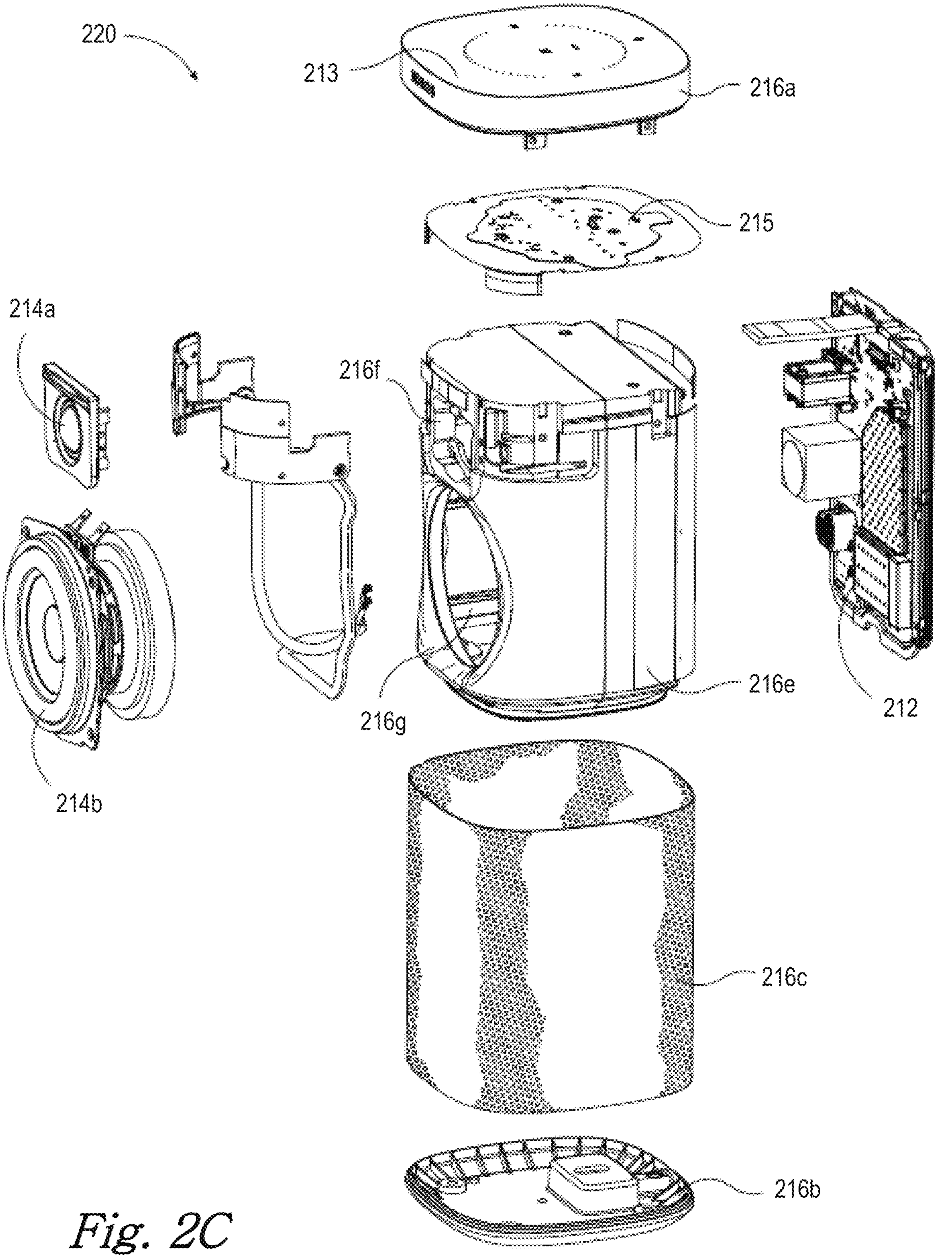
FIG. 2C is an exploded view of the network microphone device of FIGS. 2A and 2B.
Figure 2D:
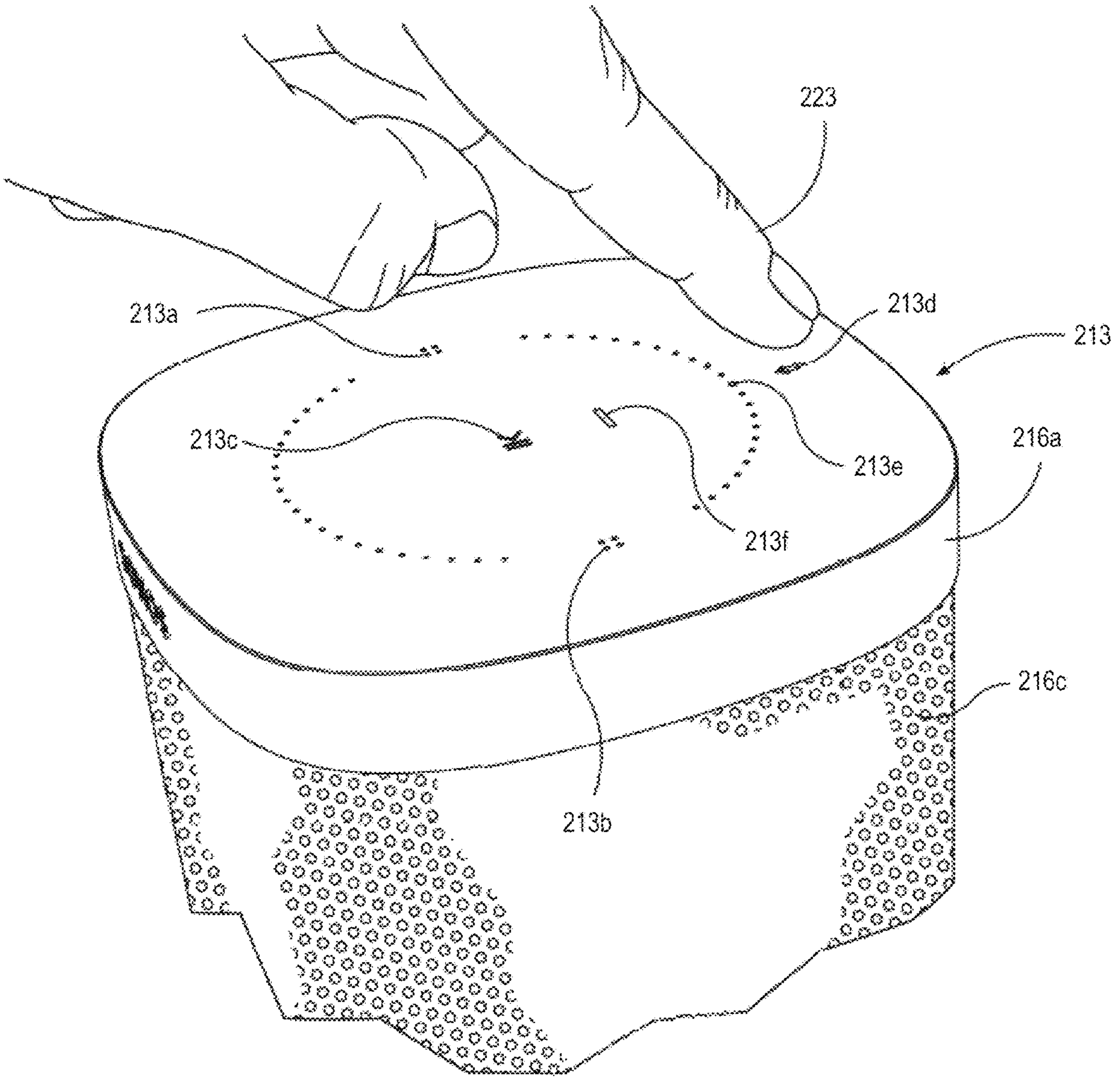
FIG. 2D is an enlarged view of a portion of FIG. 2B.

FIGS. 2A and 2B are front and right isometric side views, respectively, of an NMD 220, which may be an NMD-equipped playback device, configured in accordance with embodiments of the disclosed technology. FIG. 2C is an exploded view of the NMD 320. FIG. 2D is an enlarged view of a portion of FIG. 2B including a user interface 213 of the NMD 220. Referring to FIGS. 2A and 2B, the NMD 220 includes a housing 216 comprising an upper portion 216*a*, a lower portion 216*b* and an intermediate portion 216*c* (e.g., a grille). A plurality of ports, holes or apertures 216*d* in the upper portion 216*a* allow sound to pass through to one or more microphones 215 (FIG. 2C) positioned within the housing 216. The one or more microphones 215 are configured to receive sound via the apertures 216*d* and produce electrical signals based on the received sound. In the illustrated embodiment, a frame 216*e* (FIG. 2C) of the housing 216 surrounds cavities 216*f* and 216*g* configured to house, respectively, a first transducer 214*a* (e.g., a tweeter) and a second transducer 214*b* (e.g., a mid-woofer, a midrange speaker, a woofer). For instance, the transducers 214*a* (e.g., a tweeter) can be configured to output high frequency sound (e.g., sound waves having a frequency greater than about 2 kHz). The transducer 214*b* (e.g., a mid-woofer, woofer, or midrange speaker) can be configured to output sound at frequencies lower than the transducer 214*a* (e.g., sound waves having a frequency lower than about 2 kHz). In other embodiments, however, the NMD 220 includes a single transducer, or more than two (e.g., two, five, six) transducers. In certain embodiments, the NMD 220 omits the transducers 214*a* and 214*b* altogether.

Electronics 212 (FIG. 2C) includes components configured to drive the transducers 214*a* and 214*b*. For example, the electronics 212 is configured to receive audio content from an audio source and send electrical signals corresponding to the audio content to the transducers 214*a*, 214*b* for playback. The electronics 212 may further include components configured to analyze audio data corresponding to the electrical signals produced by the one or more microphones 215. In some embodiments, for example, the electronics 212 comprises many or all of the components of the electronics 112 described above with respect to FIG. 1C. In certain embodiments, the electronics 212 includes components described above with respect to FIG. 1F such as, for example, the one or more processors 112*a*, the memory 112*b*, the software components 112*c*, the network interface 112*d*, etc. In some embodiments, the electronics 212 includes additional suitable components (e.g., proximity or other sensors).

Referring to FIG. 2D, the user interface 213 includes a plurality of control surfaces (e.g., buttons, knobs, capacitive surfaces) including a first control surface 213*a* (e.g., a previous control), a second control surface 213*b* (e.g., a next control), and a third control surface 213*c* (e.g., a play and/or pause control) that can be adjusted by a user 223. A fourth control surface 213*d* is configured to receive touch input corresponding to activation and deactivation of the one or microphones 215. A first indicator 213*e* (e.g., one or more light emitting diodes (LEDs) or another suitable illuminator) can be configured to illuminate only when the one or more microphones 215 are activated. A second indicator 213*f* (e.g., one or more LEDs) can be configured to remain solid during normal operation and to blink or otherwise change from solid to indicate a detection of voice activity. The indicators 213*e* and/or 213*f* may also be used for other purposes, as discussed further below. In some embodiments, the user interface 213 includes additional or fewer control surfaces and illuminators. In one embodiment, for example, the user interface 213 includes the first indicator 213*e*, omitting the second indicator 213*f*. Moreover, in certain embodiments, the NMD 220 comprises a playback device and a control device, and the user interface 213 comprises the user interface of the control device.

Although the features described above with reference to FIGS. 2A-D are described in the context of the NMD 220, it will be appreciated that various examples of playback devices 110 disclosed herein may include any or all of these features.

IV. EXAMPLE ACCESSORY ATTACHMENT FEEDBACK TECHNIQUES

Figure 3:
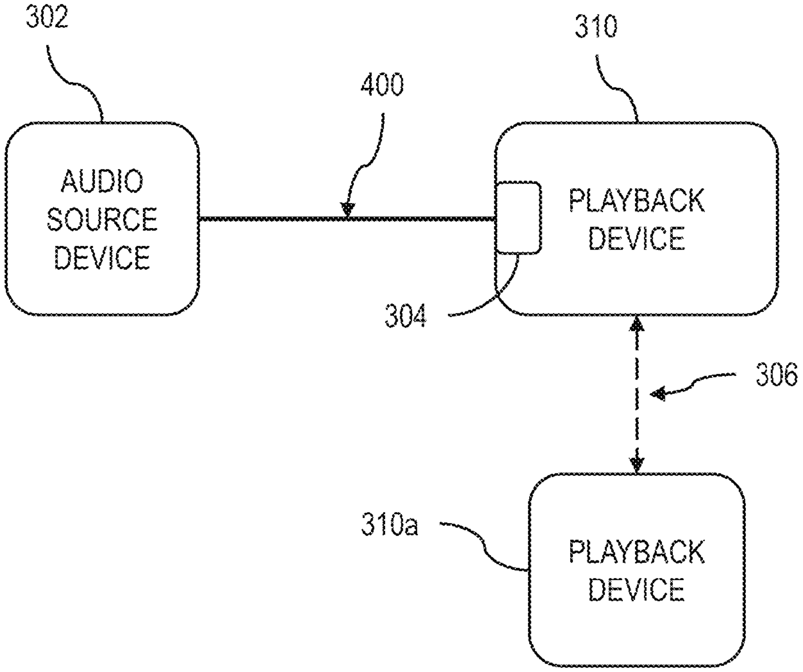
FIG. 3 is a block diagram of one example of a playback device assembly coupled to an audio source device in accordance with aspects of the disclosed technology.

As discussed above, in certain instances, an audio source device such as a turntable, radio, or other audio source device that supplies audio content for playback by one or more playback devices 110, can be connected to a playback device via a line-in connector. FIG. 3 is a block diagram illustrating an example of a playback device 310 connected to an audio source device 302 via a line-in connector 400. Accordingly, the playback device 310 includes a line-in port 304 to allow connection to the line-in connector 400. The playback device 310 receives audio content from the audio source device 302 via the line-in connector 400, and can play back the audio content using the transducers 214 and electronics 212, as discussed above. In some examples, the playback device 310 also transmits the audio (e.g., via a wireless communications link 306) to one or more other playback devices 310*a* for synchronous playback, as discussed above. The playback devices 310, 310*a* may be any of the playback devices 110 discussed above.

Figure 4:
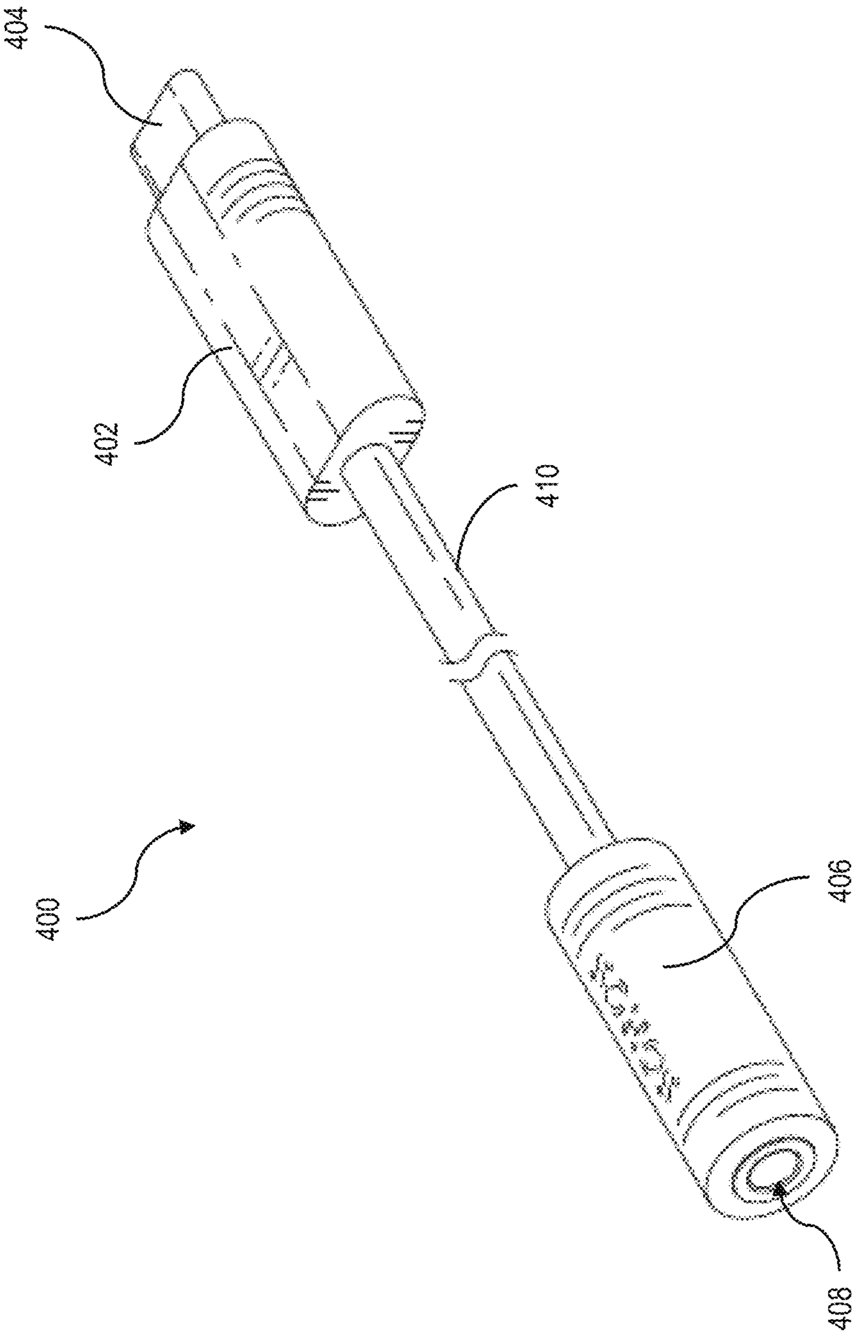
FIG. 4 is a perspective view of one example of a line-in connector in accordance with aspects of the disclosed technology.

Referring to FIG. 4, there is illustrated one example of a line-in connector 400 in accord with various embodiments disclosed herein. In this example, the line-in connector 400 includes a first body portion 402 that includes a first connector 404, and a second body portion 406 that includes second connector 408. The first and second body portions 402 and 406 are coupled together by a cable portion 410. The line-in connector 400 may provide an interface between the line-in audio source device 302 and the playback device 310 that will be used to play audio content supplied by the line-in audio source device 302. For example, the audio source device 302 can be connected to the playback device 310 by connecting the audio source device 302 to the second connector 408 and the playback device 310 to the first connector 404. In some examples, the first connector 404 is a universal serial bus (USB) connector, such as a USB-C connector, for example. The first connector 404 can be configured to connect the line-in connector 400 to the playback device 310, as discussed further below. In some examples, the second connector 408 is an audio connector, such as a 3.5 millimeter (mm) connector for example. In some examples, the second connector 408 is a stereo audio connector, such as a stereo 3.5 mm connector, for example. The second connector 408 may be configured to connect the line-in connector 400 to an audio source device 302, such as a turntable, radio, or other audio source device that supplies audio content for playback by one or more playback devices 110, as discussed further below. In the example shown in FIG. 4, the second connector 408 is a female 3.5 mm connector; however, in other examples, the second connector may be a male connector. Similarly, in the example shown in FIG. 4, the first connector 404 is a male USB connector; however, in other examples, the first connector 404 may be a female connector.

Figure 5A:
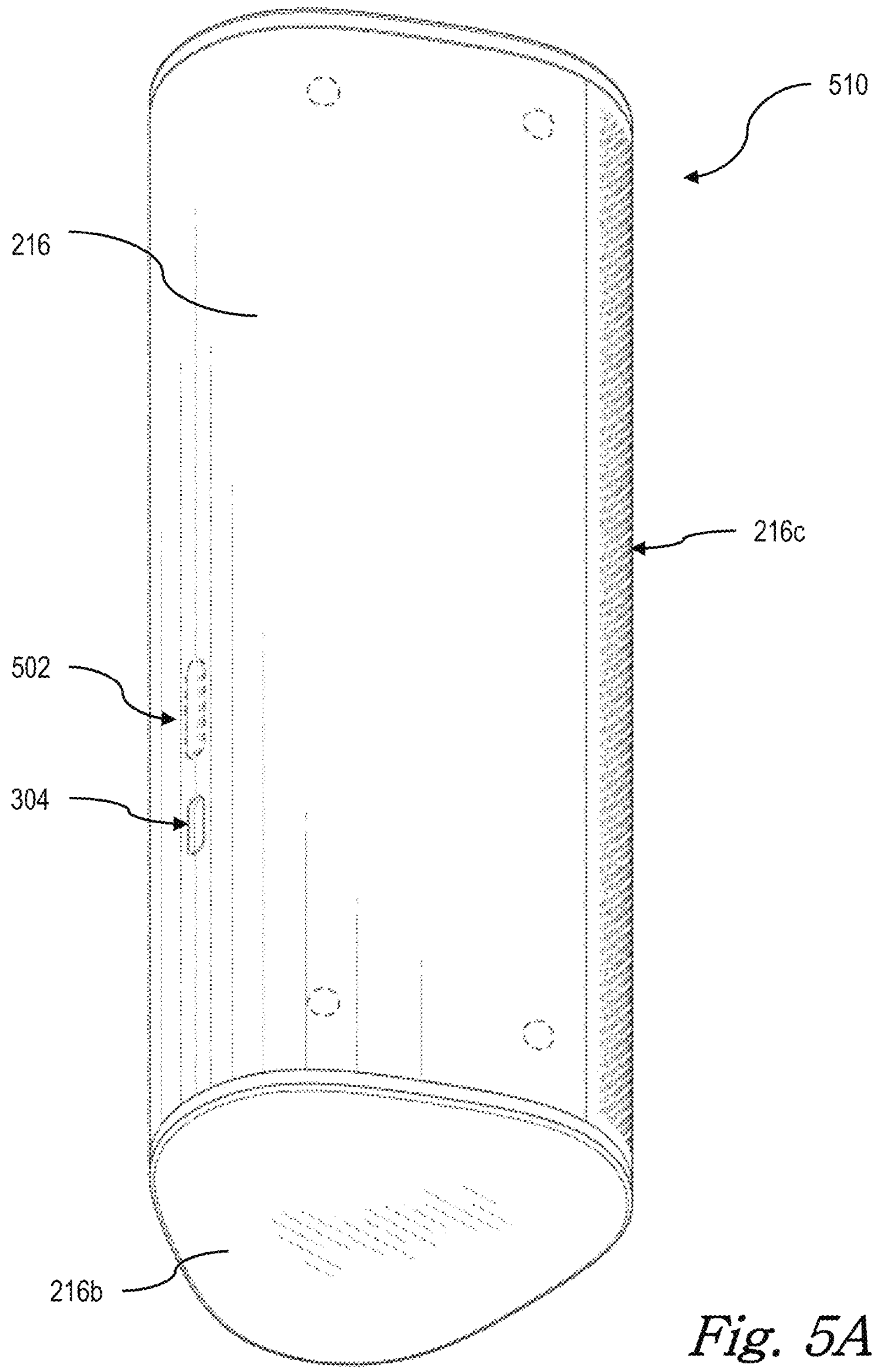
FIG. 5A is a perspective view of one example of a playback device in accordance with aspects of the disclosed technology.
Figure 5B:
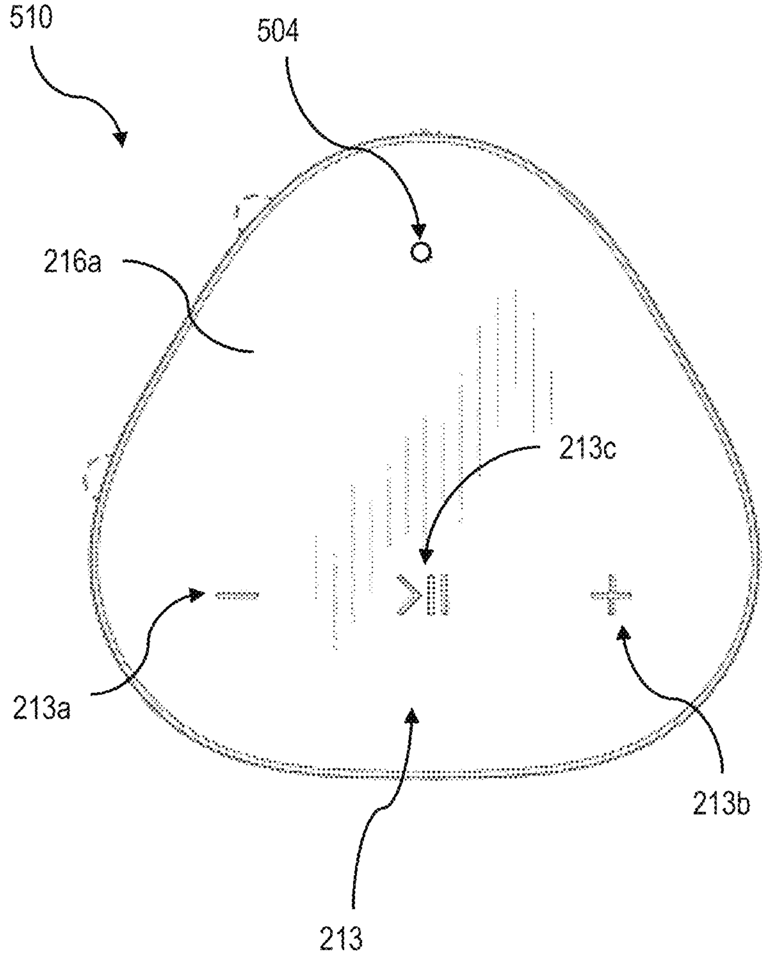
FIG. 5B is a top plan view of an example of the playback device of FIG. 5A.

FIGS. 5A and 5B illustrate an example of a playback device 510 that includes a line-in port 304 to be coupled to the line-in connector 400 in accord with various aspects described herein. The playback device 510 may be any of the playback devices 110, 310 discussed above, for example, and may be an NMD-enabled playback device incorporating any one or more of the elements and features described above with reference to FIGS. 2A-D. In some examples, the line-in port 304 includes a USB port, such as a USB-C port, for example, configured to receive the first connector 404 of the line-in connector 400. In some examples, the line-in port 304 may also be used for other functions. For example, the line-in port 304 may receive a connector of a power cable to allow the playback device to receive power from an external source to power electronic components of the playback device 510 and/or to charge an internal battery of the playback device 510. In another example, a control device, such as a controller 130 or mobile phone (e.g., acting as an audio source) may be connected to the playback device 510 via the line-in port 304.

As shown in FIG. 5A, in examples, the line-in port 304 is formed in a portion of the housing 216 of the playback device 510. In the illustrated example, the playback device 510 includes a power button 502 disposed in the housing 216 proximate the line-in port 304. In other examples, the power button 502 may be provided in a different region of the housing 216, such as in the upper portion 216*a* (FIG. 5B) or lower portion 216*b*, for example. In other examples, the power button 502 may be omitted or replaced with a button or switch used for a different purpose (e.g., to enable or disable the microphones 215 (FIG. 2C) in examples in which the playback device 510 is an NMD-enabled playback device).

As discussed above with reference to FIGS. 2A-D, examples of the playback device 510 may include a user interface 213 that includes one or more control surfaces (e.g., 213*a-c*) optionally along with other features. In the example illustrated in FIG. 5B, the user interface 213 includes a visual context indicator 504. In certain examples, the visual context indicator 504 corresponds to one of the first or second indicators 213*e*, 213*f* discussed above, and in other examples, the visual context indicator is a separate indicator. The visual context indicator may include an LED or other light emitter that can be used to provide visual feedback to a user, as described further below.

As noted above, in certain instances, there can be a delay between the time when the audio source device 302 is connected to the playback device 310 via the line-in connector 400 and playback of audio content from the audio source device 302 is initiated by a user, and the time when the playback device 310 actually begins playing the line-in audio content. This delay can be the result of the line-in connector 400, and optionally also the playback device 310, undergoing an initialization procedure to prepare for playback of the line-in audio content, as well as other factors. Aspects and embodiments disclosed herein are directed to techniques by which the playback device 310 can provide indications to a user during this delay, in the form of audio and/or visual feedback, for example, to inform the user that the system is preparing to play the line-in audio content.

Figure 6:
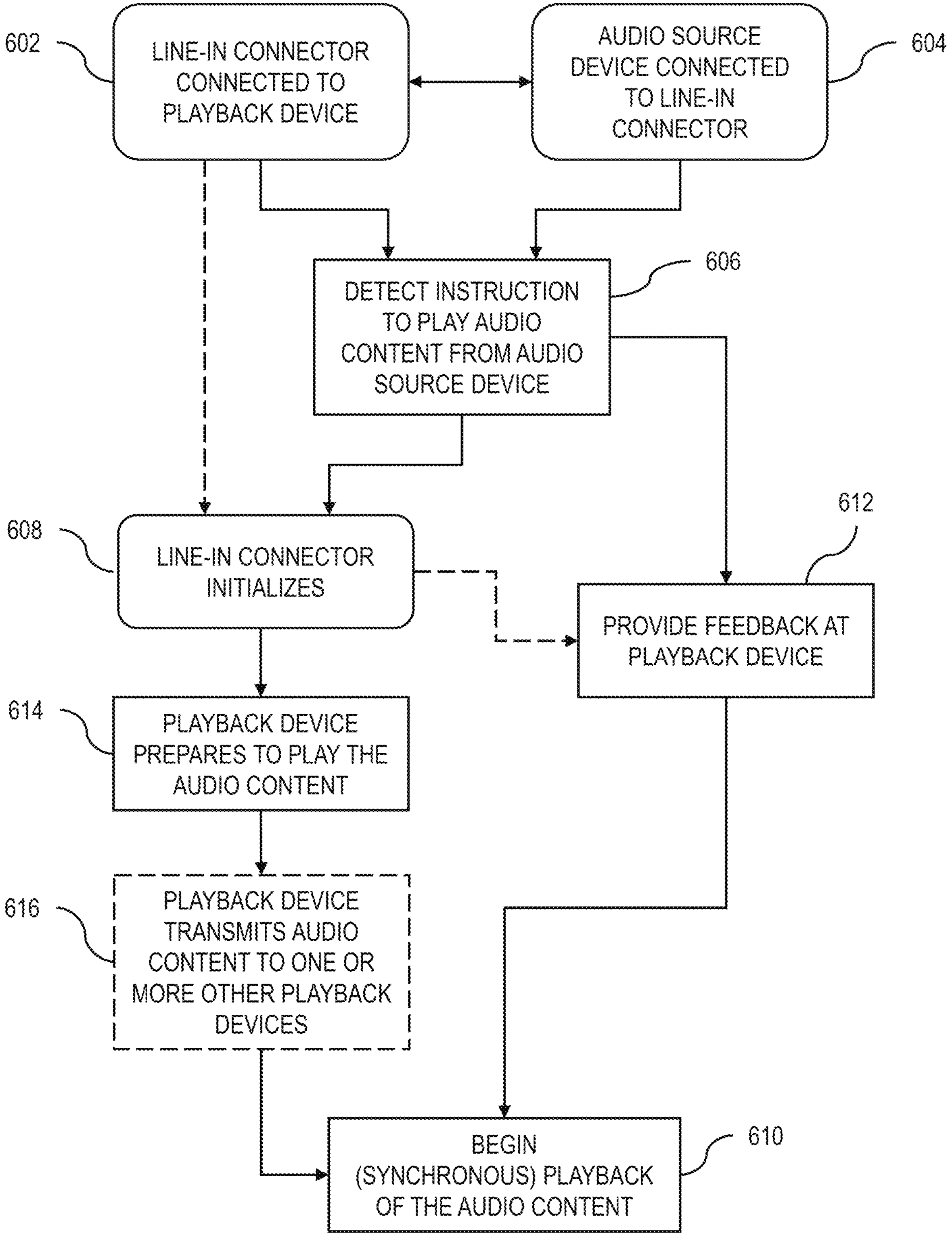
FIG. 6 is a flow diagram of one example of a methodology of providing accessory attachment status feedback via a playback device in accordance with aspects of the disclosed technology.

FIG. 6 is a flow diagram corresponding to an example of a process of providing feedback to a user regarding device status when an accessory, such as the line-in connector 400, is connected to the playback device 310 in accord with certain aspects.

At 602, the line-in connector 400 is connected to the playback device 310 via the line-in port 304. At 604, the audio source device 302 is connected to the line-in connector 400. Action 602 may occur before or after action 604. In some examples, actions 602 and 604 may occur close in time to one another (e.g., a few seconds or minutes apart). In other examples, a significant time period (e.g., hours or days) may pass between actions 602 and 604. In some examples, if the audio source device 302 is not connected to the line-in connector 400 at the time when the line-in connector 400 is connected to the playback device 310 (602), the playback device may not provide feedback (audio or visual) to the user to indicate connection of the line-in connector 400. In other examples, the playback device 310 provides audio and/or visual feedback (as described below) to indicate connection of the line-in connector 400 to the playback device 310, whether or not the audio source device 302 is connected to the line-in connector 400.

At 606, the line-in connector 400 and/or the playback device 310 detects an instruction to play audio content (a playback command) supplied by the audio source device 302. In some examples, detection of the playback command at 606 occurs after actions 602 and 604. The playback command may be provided via a control device 130, for example. In another example, the playback command is a voice command detected via the microphone(s) 215. In further examples, the playback command may be detected via a control surface on the user interface 213, for example.

In yet another example, the playback command may be detected via one or more signals output from the audio source device 302 in response to a user action performed at the audio source device (e.g., the user takes an action to cause the audio source device to begin supplying the audio content, such as pressing a "play" button or engaging the needle of a turntable, for example).

Once the audio source device 302 is connected to the line-in connector 400 at 604, actions 602 and/or 606 may cause the playback device 310 to detect connection of the audio source device 302 to the line-in port 304. In addition, at 608, the line-in connector 400 undergoes an initialization procedure to allow the playback device 310 to receive audio content from the audio source device 302 via the line-in connector 400. In some examples, when the playback device detects connection of the audio source device 302, the playback device 310 directs or causes (e.g., through one or more messages provided from the playback device 310 to the line-in connector 400) the line-in connector 400 to initialize. In other examples, the line-in connector 400 automatically initializes upon one or both of: (i) connection to the playback device 310 (602); or (ii) connection to the audio source device 302 (604). In another example, the line-in connector 400 automatically initializes in response to the playback command. In some examples, to perform the complete initialization process 608, the line-in connector 400 may need to receive audio content from the audio source device 302. Accordingly, in such examples, the line-in connector 400 may perform the initialization process 608 in response to the combination of actions 602, 604, and 606. In other examples, the line-in connector 400 may perform some portion of the initialization process 608 in response to action 602 alone, or a combination of actions 602 and 604, even if a playback command has not yet been issued at 606.

The initialization process 608 prepares the line-in connector 400 to transfer audio content from the audio source device 302 to the playback device 310. In some examples, the initialization process for the line-in connector 400 includes activating various electronic components, including a processor, and receiving timing or clock information from either the audio source device 302 or the playback device 310. The initialization process may further include exchanging handshake information and/or establishing any communications protocols needed to allow the line-in connector 400 to transfer audio content from the audio source device 302 to the playback device 310 for playback. As discussed above, the initialization process can take some time. For example, establishing a stable system clock using the timing information and setting up a properly configured audio transfer link can take several seconds (e.g., approximately 2-5 seconds). As a result, there is a delay of at least this amount of time between actions 602/606 and when the playback device 310 begins playback of the audio content at 610. In addition, in some instances it may be preferable to delay activation of (or "mute") an output analog-to-digital converter (ADC) on the line-in connector 400 to prevent noise associated with the initialization process (e.g., noise associated with activation of various electronic components) from being transferred to the playback device 310 and potentially emitted from the transducer(s) 114. In some examples, this delay may be in a range of approximately 2-4 seconds, for example, 3 seconds. Thus, the delay associated with the initialization process 608 of the line-in connector 400 may be in a range of about 3-9 seconds. Thus, the delay period may be sufficiently long that it is noticeable to a user.

As discussed above, in the absence of any device feedback to the user during this delay period corresponding to the initialization process 608, the user may conclude that one or more of the devices (e.g., the line-in connector 400, the playback device 310, and/or the audio source device 302) are not working properly, and may unnecessarily disconnect the line-in connector, interrupting the initialization process 608. Reconnecting the devices may not correct the problem as perceived by the user, since when reconnected, the line-in connector 400 may once again begin the initialization process 608 and the user will again perceive the delay. Accordingly, aspects and embodiments disclosed herein provide techniques by which the playback device 310, at 612, provides context or status feedback to the user during the initialization process 608 to indicate to the user that the playback device has detected a device connected to the line-in port 304 (referred to herein as "line-in feedback"). This line-in feedback can indicate to the user that the devices are functioning and "reassure" the user during the delay caused by the initialization process 608.

According to certain examples, the line-in feedback provided by the playback device 310 may include audio and/or visual feedback. For example, when the playback device 310 detects connection of the audio source device 302 to the line-in port 304 (which as discussed above, may occur at 602 or 606, provided that the audio source device 302 is connected to the line-in connector 400 at that time), the playback device 310 may emit, via one or more of the transducer (s) 214, one or more audible tones. In one example, the playback device 310 emits a single tone upon detection of the audio source device 302 connected to the line-in port 304. In another example, the playback device 310 emits a series of tones during the initialization period. For example, the playback device 310 may emit one or more tones periodically, such as every second, for example, until the playback device 310 is ready to begin playing audio content supplied by the audio source device 302 (e.g., completion of the initialization process 608). In some examples, the playback device 310 is configured to emit audible tones to indicate other events to the user, such as establishing a BLUETOOTH connection, for example. In such examples, the tone(s) emitted by the playback device 310 to indicate detection of the audio source device 302 connected to the line-in port 304 may have the same or different frequencies relative to tones emitted to signal other events. In other examples, the audio line-in feedback provided by playback device 310 can include sound other than a tone or series of tones. For example, the audio line-in feedback may include a voice/spoken message informing the user that connection of the audio source device has been detected and/or that the device is preparing to play the audio content. In another example, the audio line-in feedback includes a certain melody or sound effect. Many other variations and examples of audio line-in feedback that can be provided by the playback device 310 will be apparent, given the benefit of this disclosure.

In addition to, or instead of, audio line-in feedback, the playback device 310 may be configured to provide visual feedback to indicate that connection of the audio source device 302 has been detected. As discussed above, the user interface 213 of the playback device 510 may include the visual context indicator 504, which can be used to provide visual line-in feedback. For example, when the playback device 310 detects connection of the audio source device 302 to the line-in port 304, the playback device 310 may cause the visual context indicator 504 to illuminate (e.g., to emit light of a certain color). In some examples, if the visual context indicator 504 is already illuminated to indicate some other device status or context (e.g., that the device is powered or connected to BLUETOOTH or WI-FI), to provide the visual line-in feedback, the playback device 310 may cause the color of the light emitted by the visual context indicator 504 to change, thereby signaling new information to the user. In another example, to provide the visual line-in feedback, the playback device 310 may cause the visual context indicator 504 to flash (optionally in addition to changing color). In some examples, the visual line-in feedback is provided for the duration of the delay between detection of connection of the audio source device 302 to the line-in port 304 and when the playback device 310 begins playing the audio content supplied by the audio source device 302 (which may correspond to the duration of the initialization period). The audio line-in feedback can be provided by the playback device 310 while the playback device 310 is also providing the visual line-in feedback.

Thus, according to certain examples, the playback device 310 provides audio and/or visual line-in feedback during the initialization period to indicate that connection of the audio source device 302 to the line-in port 304 has been detected. As discussed above, in some examples, connection of the line-in connector 400 to the line-in port 304 (at 602) without connection of the audio source device 302 (at 604) does not cause the playback device 310 to provide line-in feedback. However, in other examples, the playback device 310 can be configured to provide audio and/or visual line-in feedback in response to detecting connection of the line-in connector 400 to the line-in port 304, whether or not the audio source device 302 is also connected to the line-in connector 400. In such examples, the line-in feedback may be provided for a shorter duration because the line-in connector 400 may not undergo the complete initialization process 608 until the audio source device 302 is connected and/or an instruction to play audio content from the audio source device 302 is provided (at 606). For example, upon detecting the line-in connector 400 connected to the line-in port 304 without the audio source device 302, the playback device 310 may emit one or more audible tones (as discussed above) to provide audio line-in feedback, and/or may briefly (e.g., for a few seconds, such as 1, 2, or 3 seconds, for example) illuminate, change the color of, and/or flash the visual context indicator 504 to provide visual line-in feedback.

Still referring to FIG. 6, in some examples, at 614 the playback device 302 takes certain actions to prepare to play audio content supplied by the audio source device 302. Although shown in sequence with block 608 in FIG. 6, the actions associated with block 614 may occur simultaneously with the actions associated with block 608. The line-in feedback provided at 612 may be provided during (or simultaneous with) actions performed by the playback device 310 at 614. The actions taken by the playback device 310 at 614 may depend on various factors, including a status of the playback device 310 at the time of detecting the playback command issued at 606. In some examples, while the line-in connector 400 performs its initialization process 608, the playback device 310 also undergoes some initialization to prepare to begin playback of the audio content supplied by the audio source device 302. This initialization of the playback device 310 may include establishing handshakes and/or any other communications protocols with the line-in connector 400 to receive the audio content from the audio source device 302 via the line-in connector 400.

In some instances, the playback device 310 may be already playing first audio content supplied from another audio source when the audio source device 302 is connected to the line-in port 304 via the line-in connector 400 and/or the playback command is detected at 606. Accordingly, in such examples, at 614, the playback device 310 prepares to transition from playback of the first audio content supplied by the other audio source to playback of second audio content supplied by the audio source device 302 via the line-in port 304. This transition may include buffering a portion of the first and/or second audio content, and activating/deactivating certain electronic components (e.g., in electronics 212) to switch an audio input path to the transducer(s) 214 from a path associated with the other audio source (e.g., audio content received over a wireless communications link) to a path coupled to the line-in port 304. Examples of transitioning a playback device 310 from receiving and playing audio content from one source to receiving and playing audio content from another source are described in more detail in U.S. Patent Publication No. 2022/0329643 titled "SEAMLESS TRANSITION OF SOURCE OF MEDIA CONTENT" filed on Apr. 29, 2022, which is hereby incorporated herein by reference in its entirety for all purposes.

As discussed above with reference to FIGS. 1A-H and 3, in certain instances, the playback device 310 is configured in a bonded group with one or more other playback devices such that the devices in the bonded group play audio content in synchrony with one another. Accordingly, in such examples, the playback device 310 may play the audio content supplied by the audio source device 302 in synchrony with one or more other playback devices 310*a*. To this end, at 616, the playback device 310 may transmit (e.g., over the wireless communications link 306) one or more audio channels of the audio content supplied by the audio source device 302 to the one or more other playback devices 310*a*. In such examples, the delay period during which the line-in feedback is provided at 612 may also include any delay associated with transmitting the audio channel(s) to the one or more other playback devices 310*a* and establishing sufficient time synchrony among the playback device 310 and the one or more other playback devices 310*a* to permit synchronous playback of the audio content, as described above. In some examples, the actions associated with block 616 may be performed (optionally along with any actions associated with block 614) during the line-in connector initialization process 608. Accordingly, in such examples, the delay during which the line-in feedback is provided at 612 may correspond to the initialization period of the line-in connector 400 and to a combination of the time associated with blocks 608, 614, and 616.

When the line-connector 400 is initialized and the playback device 310 is ready to begin playback of the audio content supplied by the audio source device 302 via the line-in connector 400, the playback device 310 begins playing the audio content at 610 (optionally in synchrony with the one or more other playback devices 310*a* if 616 is included) and ceases to provide the line-in feedback at 612. Thus, examples provide techniques for configuring the playback device 310 to provide indications (feedback), audio and/or visual, while the line-in connector 400 is initialized and the system is preparing the play line-in audio content. This feedback can indicate to a user that the devices are functioning, thus potentially avoiding the above-discussed issues and concerns that could occur in the absence of such feedback.

Figure 7:
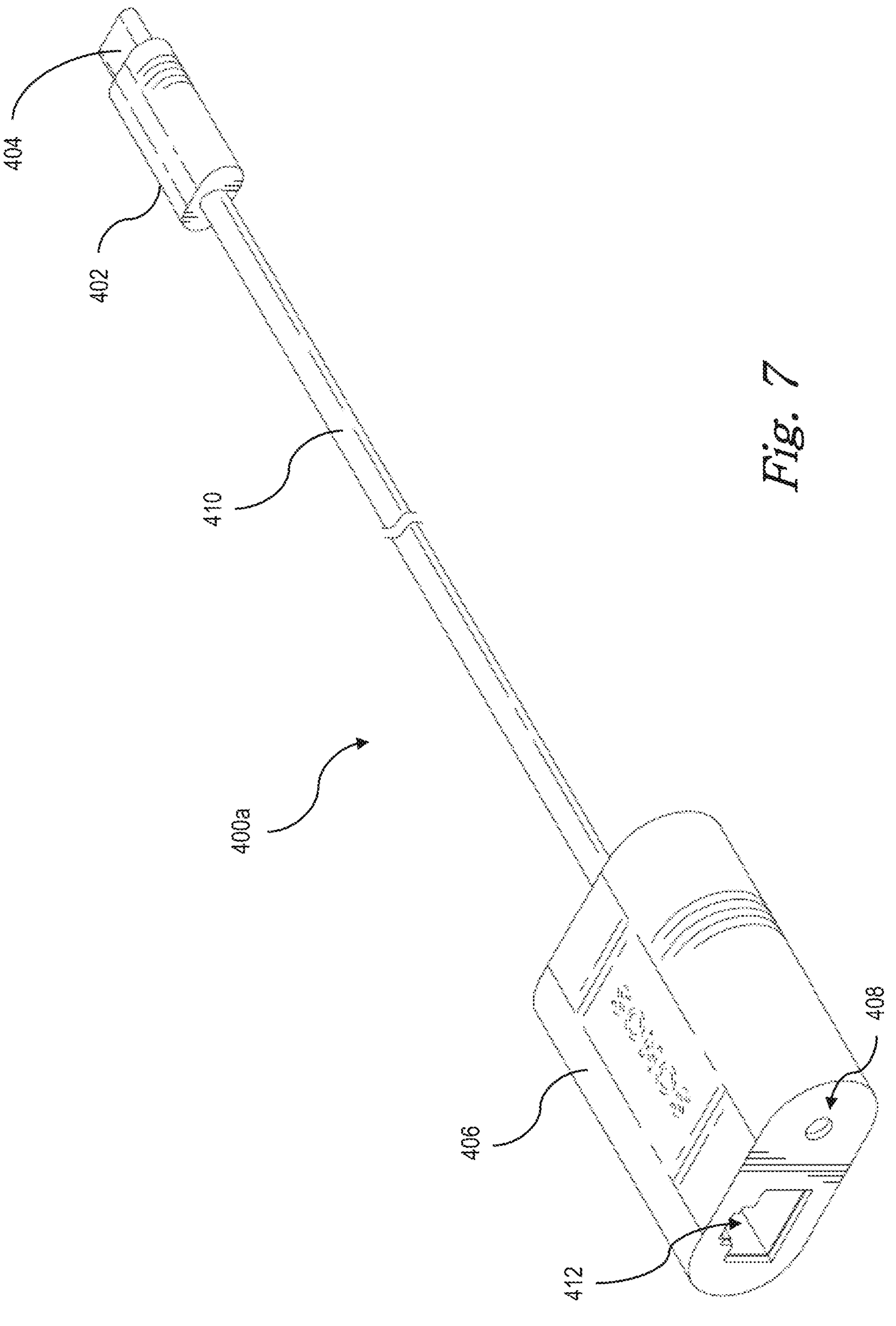
FIG. 7 is a perspective view of another example of a line-in connector in accordance with aspects of the disclosed technology.

In some examples, the line-in connector 400 includes additional features to allow for other connections to the playback device 310. For example, referring to FIG. 7, there is illustrated another example of a line-in connector 400*a*. In this example, the line-in connector includes an additional connector 412 disposed in the second body portion 406. The additional connector 412 may be an ethernet connector, for example. In such instances, the line-in connector 400*a* can be used to connect the playback device 310 (via the line-in port 304 connected to the first connector 404) to an ethernet cable, for example. Initializing an ethernet connection for the line-in connector 400*a* may also take some time. Accordingly, the playback device 310 can be configured to provide audio and/or visual feedback in response to detecting an ethernet connection via the line-in connector 400*a* and the line-in port 304. This audio and/or visual feedback can be provided by the playback device 310 in the same manner as discussed above.

Thus, aspects and embodiments provide for configuring a playback device to provide audio and/or visual feedback to a user when a device is connected to the line-in port of the playback device. This feedback can inform the user that the devices are functioning properly during any delay time period that may occur between when the connection is established at the line-in port and when the playback device begins to respond in the manner expected by the user (e.g., to play expected audio content).

V. CONCLUSION

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VI. ADDITIONAL EXAMPLES

The following examples pertain to further embodiments, from which numerous permutations and configurations will be apparent.

Example 1 provides a playback device comprising one or more speakers, one or more amplifiers configured to drive the one or more speakers, a line-in port configured to receive a line-in connector to couple the playback device to an audio source, and at least one visual context indicator configured to display, during an initialization period of the line-in connector following the audio source being coupled to the playback device via the line-in connector and the line-in port, visual feedback indicating connection of the audio source to the playback device.

Example 2 includes the playback device of Example 1, wherein the line-in port is a universal serial bus type-C (USB-C) port.

Example 3 includes the playback device of Example 2, wherein the line-in connector includes a USB-C connector configured to be coupled to the line-in port, and a 3.5 mm connector configured to be coupled to the audio source.

Example 4 includes the playback device of any one of Examples 1-3, wherein the at least one visual context indicator includes at least one light-emitting diode (LED).

Example 5 includes the playback device of Example 4, wherein the visual feedback includes one or more of illuminating the LED, changing a color of light emitted by the LED or flashing the LED.

Example 6 includes the playback device of any one of Examples 1-5, wherein the playback device is configured to output, via the one or more amplifiers and the one or more speakers, audio feedback during the initialization period of the line-in connector following the audio source being coupled to the playback device via the line-in connector and the line-in port.

Example 7 includes the playback device of Example 6, wherein the audio feedback includes one or more audible tones emitted from at least one of the one or more speakers.

Example 8 includes the playback device of any one of Examples 1-7, wherein, upon completion of the initialization period of the line-in connector, the at least one visual context indicator ceases to display the visual feedback.

Example 9 includes the playback device of Example 8, wherein upon completion of the initialization period of the line-in connector, the playback device is configured to play back, via the one or more amplifiers and the one or more speakers, audio content provided by the audio source.

Example 10 includes the playback device of Example 9, wherein the playback device is configured to transmit at least one audio channel of the audio content to at least one additional playback device and to play back at least one other audio channel of the audio content in synchrony with playback of the at least one audio channel by the at least one additional playback device.

Example 11 provides a playback device comprising, one or more speakers, one or more amplifiers configured to drive the one or more speakers, a line-in port configured to receive a line-in connector, at least one visual context indicator, at least one processor, and at least one non-transitory computer-readable medium comprising program instructions that are executable by the at least one processor to control the playback device to display, for a time period, via the at least one visual context indicator, visual feedback based on the playback device being coupled to an audio source via the line-in connector and the line-in port, and output, via the one or more amplifiers and the one or more speakers, audio feedback based on the playback device being coupled to the audio source via the line-in connector and the line-in port.

Example 12 includes the playback device of Example 11, wherein the time period corresponds to an initialization time period of the line-in connector, and wherein to display the visual feedback, the at least one non-transitory computer-readable medium further comprises program instructions that are executable by the at least one processor to control the playback device to display the visual feedback for a duration of the initialization time period.

Example 13 includes the playback device of Example 12, wherein the at least one non-transitory computer-readable medium further comprises program instructions that are executable by the at least one processor to control the playback device to cease to display the visual feedback after the duration of the initialization time period.

Example 14 includes the playback device of any one of Examples 11-13, wherein the at least one visual context indicator includes at least one light-emitting diode (LED).

Example 15 includes the playback device of Example 14, wherein the visual feedback includes one or more of emitting light with the LED, changing a color of light emitted by the LED or flashing the LED.

Example 16 includes the playback device of any one of Examples 11-15, wherein the line-in port is a universal serial bus type-C (USB-C) port.

Example 17 includes the playback device of Example 16, wherein the line-in connector includes a USB-C connector configured to be coupled to the line-in port, and a 3.5 mm connector configured to be coupled to the audio source.

Example 18 includes the playback device of Example 17, wherein the line-in connector further includes an ethernet connector.

Example 19 includes the playback device of any one of Examples 11-18, wherein the at least one non-transitory computer-readable medium further comprises program instructions that are executable by the at least one processor to control the playback device to, at an end of the time period, begin playback, via the one or more amplifiers and the one or more speakers, of audio content provided by the audio source.

Example 20 includes the playback device of any one of Examples 11-19, wherein the audio feedback includes one or more audible tones emitted by at least one of the one or more speakers.

Example 21 includes the playback device of any one of Examples 11-20, wherein the playback device is a portable playback device.

Example 22 includes the playback device of any one of Examples 11-21, wherein the at least one non-transitory computer-readable medium further comprises program instructions that are executable by the at least one processor to control the playback device to, transmit at least one audio channel of audio content provided by the audio source to at least one other playback device, and at an end of the time period, begin playback, via the one or more amplifiers and the one or more speakers, of at least one other audio channel of the audio content in synchrony with playback of the at least one audio channel by the at least one other playback device.

Example 23 includes the playback device of any one of Examples 11-21, wherein at least one non-transitory computer-readable medium further comprises program instructions that are executable by the at least one processor to control the playback device to play back first audio content via the one or more amplifiers and the one or more speakers, and at an end of the time period, cease playback of the first audio content and begin playback, via the one or more amplifiers and the one or more speakers, of second audio content provided by the audio source.

Example 24 includes the playback device of Example 23, wherein the at least one non-transitory computer-readable medium further comprises program instructions that are executable by the at least one processor to control the playback device to display the visual feedback during playback of the first audio content.

Example 25 is a method of providing information to a user of a playback device, the method comprising detecting connection of a line-in audio source to the playback device via a line-in connector, initializing the line-in connector to allow the playback device to obtain audio content from the line-in audio source, during an initialization time period of the line-in connector, providing audio and visual feedback indications via the playback device, and after completion of the initialization time period, playing back, with the playback device, the audio content obtained from the line-in audio source.

Example 26 includes the method of Example 25, wherein providing the audio feedback indication includes playing, with the playback device, one or more audible tones.

Example 27 includes the method of one of Examples 25 and 26, wherein providing the visual feedback indication includes at least one of illuminating a light-emitting diode (LED) on the playback device, changing a color of light emitted by the LED on the playback device, or flashing the LED on the playback device.

Example 28 includes the method of any one of Examples 25-27, wherein providing the visual feedback indication includes providing the visual feedback indication for a duration of the initialization time period.

Example 29 includes the method of Example 28, further comprising, after completion of the initialization time period, ceasing to display the visual feedback indication.

Example 30 includes the method of any one of Examples 25-29, further comprising during the initialization time period, playing back, with the playback device, other audio content.

Example 31 includes the method of any one of Examples 25-30, further comprising transmitting at least one audio channel of the audio content from the playback device to at least one other playback device, and wherein playing back, with the playback device, the audio content includes playing back, with the playback device, one or more channels of the audio content in synchrony with playback of the at least one audio channel of the audio content by the at least one other playback device.

Example 40 provides a playback device assembly comprising a line-in connector having a universal serial bus type-C (USB-C) connector and a 3.5 mm connector, and a playback device. The playback device comprises one or more speakers, one or more amplifiers configured to drive the one or more speakers, a USB-C line-in port configured to couple to the USB-C connector of the line-in connector, at least one light emitting diode (LED), at least one processor, and at least one non-transitory computer-readable medium. The at least one non-transitory computer-readable medium comprises program instructions that are executable by the at least one processor to control the playback device to display, for a time period, via the at least one LED, visual feedback based on the playback device being coupled to an external device via the line-in connector and the USB-C line-in port, and output, via the one or more amplifiers and the one or more speakers, audio feedback based on the playback device being coupled to the external device via the line-in connector and the USB-C line-in port.

Example 41 includes the playback device assembly of Example 40, wherein the external device is an audio source.

Example 42 includes the playback device assembly of one of Examples 40 and 41, wherein the at least one non-transitory computer-readable medium further comprises program instructions that are executable by the at least one processor to control the playback device to, at an end of the time period, begin playback, via the one or more amplifiers and the one or more speakers, of audio content provided by the audio source.

Example 43 includes the playback device assembly of Example 42, wherein the at least one non-transitory computer-readable medium further comprises program instructions that are executable by the at least one processor to control the playback device to transmit at least one audio channel of the audio content to at least one other playback device, and, at the end of the time period, begin playback, via the one or more amplifiers and the one or more speakers, of one or more audio channels of the audio content in synchrony with playback, by the at least one other playback device, of the at least one audio channel of the audio content.

Example 44 includes the playback device assembly of Example 42, wherein the at least one non-transitory computer-readable medium further comprises program instructions that are executable by the at least one processor to control the playback device to play back during the time period, via the one or more amplifiers and the one or more speakers, other audio content, transition from playback of the other audio content to playback of the audio content provided by the audio source, and at the end of the time period, play back, via the one or more amplifiers and the one or more speakers, the audio content provided by the audio source.

Example 45 includes the playback device assembly of any one of Examples 40-44, wherein the visual feedback includes one or more of illuminating the LED, changing a color of light emitted by the LED, or flashing the LED.

Example 46 includes the playback device assembly of any one of Examples 40-45, wherein the audio feedback includes one or more audible tones.

Example 47 includes the playback device assembly of any one of Examples 40-46, wherein the at least one non-transitory computer-readable medium further comprises program instructions that are executable by the at least one processor to control the playback device to detect connection of the external device to the USB-C line-in port, and output the audio feedback based on detection of the connection of the external device.

Example 48 includes the playback device assembly of any one of Examples 40-47, wherein the line-in connector further comprises an ethernet connector.

Example 49 includes the playback device of assembly of Example 48, wherein the at least one non-transitory computer-readable medium further comprises program instructions that are executable by the at least one processor to control the playback device to detect establishment of an ethernet connection to the playback device via the ethernet connector, and provide additional audio and/or visual feedback based on detection of the establishment of the ethernet connection.

The invention claimed is:

1. A playback device comprising:
- one or more speakers;
- one or more amplifiers configured to drive the one or more speakers;
- a line-in port configured to receive a line-in connector;
- at least one visual context indicator;
- at least one processor; and
- at least one non-transitory computer-readable medium comprising program instructions that are executable by the at least one processor to control the playback device to:
  - detect connection of the playback device to an audio source via the line-in port and the line-in connector,
  - display, for an initialization time period of the line-in connector, via the at least one visual context indicator, visual feedback based on the playback device being coupled to the audio source via the line-in connector and the line-in port, and
  - output, via the one or more amplifiers and the one or more speakers, audio feedback based on the playback device being coupled to the audio source via the line-in connector and the line-in port, and
  - cease to display the visual feedback after the initialization time period.

2. The playback device of claim 1, wherein the at least one visual context indicator includes at least one light-emitting diode (LED); and
- wherein the visual feedback includes one or more of illuminating the LED, changing a color of light emitted by the LED, or flashing the LED.

3. The playback device of claim 1, wherein the line-in port is a universal serial bus type-C (USB-C) port.

4. The playback device of claim 3, wherein the line-in connector includes a USB-C connector configured to be coupled to the line-in port, and a 3.5 mm connector configured to be coupled to the audio source.

5. The playback device of claim 1, wherein the at least one non-transitory computer-readable medium further comprises program instructions that are executable by the at least one processor to control the playback device to, after the initialization time period, begin playback, via the one or more amplifiers and the one or more speakers, of audio content provided by the audio source.

6. The playback device of claim 1, wherein the audio feedback includes one or more audible tones.

7. The playback device of claim 1, wherein the playback device is a portable playback device.

8. A method of providing information to a user of a playback device, the method comprising:
- detecting connection of a line-in audio source to the playback device via a line-in connector;
- initializing the line-in connector to allow the playback device to obtain audio content from the line-in audio source;
- during an initialization time period of the line-in connector, providing audio and visual feedback indications via the playback device; and after completion of the initialization time period, playing back, with the playback device, the audio content obtained from the line-in audio source.

9. The method of claim 8, wherein providing the audio feedback indication includes playing, with the playback device, one or more audible tones.

10. The method of claim 8, wherein providing the visual feedback indication includes at least one of illuminating a light-emitting diode (LED) on the playback device, changing a color of light emitted by the LED on the playback device, or flashing the LED on the playback device.

11. The method of claim 8, wherein providing the visual feedback indication includes providing the visual feedback indication for the initialization time period.

12. The method of claim 11, further comprising, after completion of the initialization time period, ceasing to display the visual feedback indication.

13. A playback device assembly comprising:

a line-in connector having a universal serial bus type-C (USB-C) connector and a 3.5 mm connector; and a playback device comprising:

one or more speakers;

one or more amplifiers configured to drive the one or more speakers;

a USB-C line-in port configured to couple to the USB-C connector of the line-in connector;

at least one light emitting diode (LED);

at least one processor; and at least one non-transitory computer-readable medium comprising program instructions that are executable by the at least one processor to control the playback device to:

detect connection of an external audio source to the USB-C line-in port, display, for an initialization time period of the line-in connector, via the at least one LED, visual feedback based on the playback device being coupled to the external audio source via the line-in connector and the USB-C line-in port, output, via the one or more amplifiers and the one or more speakers, audio feedback based on the playback device being coupled to the external audio source via the line-in connector and the USB-C line-in port, and cease to display the visual feedback after the initialization time period.

14. The playback device assembly of claim 13, wherein the at least one non-transitory computer-readable medium further comprises program instructions that are executable by the at least one processor to control the playback device to, at an end of the initialization time period, begin playback, via the one or more amplifiers and the one or more speakers, of audio content provided by the external audio source.

15. The playback device assembly of claim 13, wherein the visual feedback includes one or more of illuminating the LED, changing a color of light emitted by the LED, or flashing the LED.

16. The playback device assembly of claim 13, wherein the audio feedback includes one or more audible tones.

17. The playback device assembly of claim 13, wherein the line-in connector further comprises an ethernet connector.

18. The playback device of assembly of claim 17, wherein the at least one non-transitory computer-readable medium further comprises program instructions that are executable by the at least one processor to control the playback device to:

detect establishment of an ethernet connection to the playback device via the ethernet connector; and provide additional audio and/or visual feedback based on detection of the establishment of the ethernet connection.

* * * * *